(12) United States Patent
Ohta

(10) Patent No.: US 11,264,640 B2
(45) Date of Patent: Mar. 1, 2022

(54) GARNET-TYPE ION-CONDUCTING OXIDE AND METHOD FOR PRODUCING OXIDE ELECTROLYTE SINTERED BODY

(71) Applicant: TOYOTA JIDOSHA KABUSHIKI KAISHA, Toyota (JP)

(72) Inventor: Shingo Ohta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/126,137

(22) Filed: Sep. 10, 2018

(65) Prior Publication Data

US 2019/0088993 A1 Mar. 21, 2019

(30) Foreign Application Priority Data

Sep. 21, 2017 (JP) .............................. JP2017-181508

(51) Int. Cl.
*H01M 10/0562* (2010.01)
*H01M 10/0525* (2010.01)
(Continued)

(52) U.S. Cl.
CPC ...... *H01M 10/0562* (2013.01); *C01G 25/006* (2013.01); *C01G 33/006* (2013.01);
(Continued)

(58) Field of Classification Search
CPC .................. H01M 10/0525; H01M 10/0562
See application file for complete search history.

(56) References Cited

U.S. PATENT DOCUMENTS 6,645,675 B1 11/2003 Munshi
9,362,546 B1 6/2016 Donnelly et al.
(Continued)

FOREIGN PATENT DOCUMENTS

CN 102292849 A 12/2011
CN 103403946 A 11/2013
(Continued)

OTHER PUBLICATIONS

Zhen Feng Yow et al., "Effect of Li+/H+ exchange in water treated Ta-doped Li₇La₃Zr₂O₁₂", Solid State Ionics, 2016, pp. 122-129, vol. 292.
(Continued)

*Primary Examiner* — Sarah A. Slifka
*Assistant Examiner* — Rachel L Zhang
(74) *Attorney, Agent, or Firm* — Sughrue Mion, PLLC

(57) ABSTRACT

A garnet-type ion-conducting oxide configured to inhibit lithium carbonate formation on the surface of crystal particles thereof, and a method for producing an oxide electrolyte sintered body using the garnet-type ion-conducting oxide. The garnet-type ion-conducting oxide represented by a general formula $(Li_{x-3y-z}, E_y, H_z)L_\alpha M_\beta O_\gamma$ (where E is at least one kind of element selected from the group consisting of Al, Ga, Fe and Si; L is at least one kind of element selected from an alkaline-earth metal and a lanthanoid element: M is at least one kind of element selected from a transition element which be six-coordinated with oxygen and typical elements in groups 12 to 15 of the periodic table; $3 \le x-3y-z$; $0 \le y \le 0.22$; $C \le z \le 2.8$; $2.5 \le \alpha \le 3.5$; $1.5 \le \approx \le 2.5$; and $11 \le \gamma \le 13$), wherein a half-width of a diffraction peak which has a highest intensity and which is observed at a diffraction angle (2θ) in a range of from 29° to 32° as a result of X-ray diffraction measurement using CuKα radiation, is 0.164° or less.

1 Claim, 6 Drawing Sheets

(51) Int. Cl.

| | | |
|---|---|---|
| C04B 35/486 | (2006.01) | |
| C01G 33/00 | (2006.01) | |
| C04B 35/495 | (2006.01) | |
| C04B 35/645 | (2006.01) | |
| C04B 35/653 | (2006.01) | |
| C01G 25/00 | (2006.01) | |

(52) U.S. Cl.
CPC .......... *C04B 35/486* (2013.01); *C04B 35/495* (2013.01); *C04B 35/645* (2013.01); *C04B 35/653* (2013.01); *H01M 10/0525* (2013.01); *C01P 2002/54* (2013.01); *C01P 2002/72* (2013.01); *C01P 2002/89* (2013.01); *C01P 2004/51* (2013.01); *C01P 2004/61* (2013.01); *C01P 2004/62* (2013.01); *C01P 2006/40* (2013.01); *C04B 2235/3203* (2013.01); *C04B 2235/3205* (2013.01); *C04B 2235/3217* (2013.01); *C04B 2235/3224* (2013.01); *C04B 2235/3227* (2013.01); *C04B 2235/3251* (2013.01); *C04B 2235/3272* (2013.01); *C04B 2235/3286* (2013.01); *C04B 2235/3409* (2013.01); *C04B 2235/3418* (2013.01); *C04B 2235/443* (2013.01); *C04B 2235/444* (2013.01); *C04B 2235/5436* (2013.01); *C04B 2235/76* (2013.01); *C04B 2235/764* (2013.01); *C04B 2235/81* (2013.01); *H01M 2300/0068* (2013.01); *H01M 2300/0077* (2013.01)

(56) References Cited

U.S. PATENT DOCUMENTS

| | | | | |
|---|---|---|---|---|
| 9,531,036 | B2 * | 12/2016 | Ohta | ................ H01M 10/0562 |
| 2007/0259271 | A1 | 11/2007 | Nanno et al. | |
| 2010/0203383 | A1 | 8/2010 | Weppner | |
| 2010/0233547 | A1 | 9/2010 | Baba et al. | |
| 2011/0244337 | A1 * | 10/2011 | Ohta | .................... C04B 35/481 |
| | | | | 429/319 |
| 2012/0276457 | A1 | 11/2012 | Hirose et al. | |
| 2012/0328915 | A1 | 12/2012 | Hirose et al. | |
| 2013/0084505 | A1 | 4/2013 | Iriyama et al. | |
| 2013/0266842 | A1 | 10/2013 | Woehrle et al. | |
| 2013/0323604 | A1 | 12/2013 | Teshima et al. | |
| 2014/0017577 | A1 | 1/2014 | Minami et al. | |
| 2014/0099528 | A1 | 4/2014 | Lockett et al. | |
| 2014/0162113 | A1 * | 6/2014 | Ohta | ....................... H01B 1/08 |
| | | | | 429/162 |
| 2014/0227614 | A1 | 8/2014 | Lee et al. | |
| 2015/0056519 | A1 | 2/2015 | Ohta et al. | |
| 2015/0099188 | A1 | 4/2015 | Holme et al. | |
| 2015/0111110 | A1 | 4/2015 | Watanabe et al. | |
| 2015/0280296 | A1 | 10/2015 | Kang et al. | |
| 2016/0211498 | A1 | 7/2016 | Kim et al. | |
| 2017/0062823 | A1 | 3/2017 | Yamaguchi et al. | |
| 2017/0117547 | A1 | 4/2017 | Fanous et al. | |
| 2017/0222254 | A1 | 8/2017 | Sakamoto et al. | |
| 2017/0271639 | A1 | 9/2017 | Yoshima et al. | |
| 2017/0309916 | A1 | 10/2017 | Toyoda et al. | |
| 2017/0346092 | A1 | 11/2017 | Yada et al. | |
| 2017/0358829 | A1 | 12/2017 | Inoue et al. | |
| 2018/0175446 | A1 | 6/2018 | Nishizaki et al. | |
| 2018/0219253 | A1 * | 8/2018 | Ohta | ................ H01M 10/0562 |
| 2018/0248201 | A1 * | 8/2018 | Shimoda | ............... H01M 4/134 |
| 2019/0074543 | A1 * | 3/2019 | Houjyou | ........... H01M 10/0525 |
| 2019/0088993 | A1 * | 3/2019 | Ohta | ................ H01M 10/0525 |
| 2019/0207248 | A1 * | 7/2019 | Ohta | ..................... H01M 4/366 |
| 2019/0207249 | A1 * | 7/2019 | Nakanishi | .......... H01M 4/62 |
| 2019/0207250 | A1 * | 7/2019 | Nakanishi | ............. H01M 2/145 |

FOREIGN PATENT DOCUMENTS

| | | |
|---|---|---|
| CN | 103904290 A | 7/2014 |
| CN | 104272518 A | 1/2015 |
| CN | 105811006 A | 7/2016 |
| CN | 106486671 A | 3/2017 |
| CN | 107017388 A | 8/2017 |
| CN | 107437633 A | 12/2017 |
| EP | 3 252 024 A1 | 12/2017 |
| EP | 3 410 529 A1 | 12/2018 |
| JP | 2001-210360 A | 8/2001 |
| JP | 2007-005279 A | 1/2007 |
| JP | 2010-056027 A | 3/2010 |
| JP | 2011-054457 A | 3/2011 |
| JP | 2011-070939 A | 4/2011 |
| JP | 2012-018792 A | 1/2012 |
| JP | 2012-096940 A | 5/2012 |
| JP | 2012096940 * | 5/2012 |
| JP | 2012-174659 A | 9/2012 |
| JP | 2013-008587 A | 1/2013 |
| JP | 2013-37992 A | 2/2013 |
| JP | 2013-532361 A | 8/2013 |
| JP | 2013-187260 A | 9/2013 |
| JP | 2013-219017 A | 10/2013 |
| JP | 2013-232284 A | 11/2013 |
| JP | 2013-256435 A | 12/2013 |
| JP | 2014-241288 A | 12/2014 |
| JP | 2015-038030 A | 2/2015 |
| JP | 2015-041573 A | 3/2015 |
| JP | 2015-060737 A | 3/2015 |
| JP | 2016-040767 A | 3/2016 |
| JP | 2016-517157 A | 6/2016 |
| JP | 2016-171068 A | 9/2016 |
| JP | 2016-225089 A | 12/2016 |
| JP | 2017-033801 A | 2/2017 |
| JP | 2017-033926 A | 2/2017 |
| JP | 2017-168317 A | 9/2017 |
| JP | 2017-216222 A | 12/2017 |
| JP | 2018-206727 A | 12/2018 |
| KR | 10-2016-0065133 A | 6/2016 |
| KR | 10-2017-0134231 A | 12/2017 |
| WO | 2012/114193 A1 | 8/2012 |
| WO | 2014/176266 A1 | 10/2014 |
| WO | 2015/054320 A2 | 4/2015 |
| WO | 2016/210371 A1 | 12/2016 |
| WO | 2017/015511 A1 | 1/2017 |
| WO | 2017/018217 A1 | 2/2017 |
| WO | 2017/130622 A1 | 8/2017 |
| WO | 2017/190135 A1 | 11/2017 |

OTHER PUBLICATIONS

Roof et al., "Crystal growth of a series of lithium garnets $Ln_3Li_5Ta_2O_{12}$ (Ln=La, Pr, Nd): Structural properties, Alexandrite effect and unusual ionic conductivity", Journal of Solid Chemistry, 2009, vol. 182, pp. 295-300 (total 6 pages).

Awaka et al., "Single Crystal Synthesis of Cubic Garnet Related-type $Li_7La_3Zr_2O_{12}$ by a Self-Flux Method", Key Engineering Materials, 2011, vol. 485, pp. 99-102 (total 4 pages).

Awaka et al., "Synthesis and structure analysis of tetragonal $Li_7La_3Zr_2O_{12}$ with the garnet-related type structure", Journal of Solid State Chemistry, 2009, vol. 182, pp. 2046-2052 (total 7 pages).

Communication dated Jan. 28, 2020 by the U.S. Patent and Trademark Office in copending U.S. Appl. No. 16/121,030.

Notice of Allowance dated Nov. 18, 2019 issued by the United States Patent and Trademark Office in U.S. Appl. No. 15/605,006 (13 pages).

Kihira et al, "Effect of Simultaneous Substitution of Alkali Earth Metals and Nb in $Li_7La_3Zr_2O_{12}$ on Lithium-Ion Conductivity", ECS Electrochemistry Letters, vol. 2, No. 7, 2013, pp. A56-A59 (4 pages total).

Office Action dated Dec. 26, 2019 issued by the United States Patent and Trademark Office in U.S. Appl. No. 15/868,431.

Office Action dated Oct. 18, 2019 issued by United States Patent and Trademark office in U.S. Appl. No. 16/232,631.

Office Action dated Oct. 18, 2019 issued by United States Patent and Trademark office in U.S. Appl. No. 16/232,635.

Office Action dated Apr. 25, 2019 issued by United States Patent and Trademark office in U.S. Appl. No. 15/605,006.

(56) References Cited

OTHER PUBLICATIONS

Notice of Allowance dated Jul. 30, 2019 issued by United States Patent and Trademark office in U.S. Appl. No. 15/903,092.
Notice of Allowance dated Aug. 26, 2019 issued by United States Patent and Trademark office in U.S. Appl. No. 15/605,006.
Mizuno et al., "Environmentally Friendly Flux Growth of High-Quality, Idiomorphic $Li_5La_3Nb_2O_{12}$ Crystals", Crystal Growth & Design, American Chemical Society, vol. 13, pp. 479-484, 2013, 6 pages total.
Office Action dated Jul. 15, 2020, issued by the U.S. Patent and Trademark Office in U.S. Appl. No. 16/232,600.
Notice of Allowance dated Mar. 20, 2020, issued by the U.S. Patent and Trademark Office in U.S. Appl. No. 15/605,006.
Office Action dated Apr. 16, 2020, issued by the U.S. Patent and Trademark Office in U.S. Appl. No. 16/232,631.
Office Action dated Apr. 13, 2020, issued by the U.S. Patent and Trademark Office in U.S. Appl. No. 15/868,431.
Office Action dated Apr. 17, 2020, issued by the U.S. Patent and Trademark Office in U.S. Appl. No. 16/232,635.
Notice of Allowance dated May 19, 2020, issued by the U.S. Patent and Trademark Office in U.S. Appl. No. 16/121,030.
Notice of Allowance dated Jun. 22, 2020, issued by the U.S. Patent and Trademark Office in U.S. Appl. No. 15/868,431.
Notice of Allowance dated Aug. 25, 2020, issued by the U.S. Patent and Trademark Office in U.S. Appl. No. 15/605,006.
Office Action dated Oct. 27, 2020, issued by the U.S. Patent and Trademark Office in U.S. Appl. No. 16/232,631.
Office Action dated Nov. 10, 2020, issued by the U.S. Patent and Trademark Office in U.S. Appl. No. 16/232,635.
Notice of Allowance dated Apr. 1, 2021, from the USPTO in U.S. Appl. No. 16/232,631.
Final Office Action dated Dec. 18, 2020 by the United States Patent Office in U.S. Appl. No. 16/232,600.
Daniel Rettenwander et al., "Crystal chemistry of "Li7La3Zr2O12" garnet doped with Al, Ga, and Fe: a short review on local structures as revealed by NMR and Mopbauer spectroscopy studies", European Journal of Mineralogy, 2016, vol. 28, No. 3, pp. 619-629 (11 pages total).
Office Action dated Jun. 23, 2021 in U.S. Appl. No. 16/232,635.
G. Larraz et al., "Cubic phases of garnet-type $Li_7La_3Zr_2O_{12}$: the role of hydration", Journal of Materials Chemistry A, 2013, vol. 1, No. 37, p. 11419-11428 (10 pages total).
Notice of Allowance dated Oct. 6, 2021 in U.S. Appl. No. 16/232,600.
Notice of Allowance dated Oct. 6, 2021 in U.S. Appl. No. 16/232,635.

\* cited by examiner

GARNET-TYPE ION-CONDUCTING OXIDE AND METHOD FOR PRODUCING OXIDE ELECTROLYTE SINTERED BODY

TECHNICAL FIELD

The disclosure relates to a garnet-type ion-conducting oxide and a method for producing an oxide electrolyte sintered body.

BACKGROUND

Recently, as a material for a solid electrolyte, attention is drawn to a garnet-type ion-conducting oxide comprising at least Li, La, Zr and O (hereinafter it may be referred to as LLZ).

When a garnet-type or garnet-like solid electrolyte ceramics material is left to stand in the air, its ion conductivity is decreased lower than the ion conductivity just after the material was synthesized or sintered, and the material cannot exert its inherent excellent performance to the maximum extent. To solve the problem, for example, Patent Literature 1 discloses a method for regaining decreased ion conductivity by heating a garnet-type or garnet-like solid electrolyte ceramics material comprising at least Li, La, Zr and O in a temperature range of 650° C. or more in an inert gas atmosphere.

As a material with high proton conductivity and heat resistance, Patent Literature 2 discloses a garnet-type ion-conducting oxide in which part of Li atoms have been substituted with H atoms.

Patent Literature 1: Japanese Patent Application Laid-Open (JP-A) No. 2013-219017
Patent Literature 2: JP-A No. 2012-096940
Non-Patent Literature 1: Solid State Ionics 292 (2016) 122-129

As described in Patent Literature 1, the garnet-type ion-conducting oxide is known to have a problem of decrease in ion conductivity in the air or in dry air. A cause of the problem is that the garnet-type ion-conducting oxide reacts with $CO_2$ to form lithium carbonate ($Li_2CO_3$) on the surface of the crystal particles of the oxide.

This problem can be avoided by handling the garnet-type ion-conducting oxide only in a glove box. However, it poses problems such as poor workability, low productivity and high production cost.

SUMMARY

In light of the above circumstance, a garnet-type ion-conducting oxide configured to inhibit lithium carbonate formation on the surface of crystal particles thereof, and a method for producing an oxide electrolyte sintered body using the garnet-type ion-conducting oxide, will be disclosed below.

In a first embodiment, there is provided a garnet-type ion-conducting oxide represented by a general formula $(Li_{x-3y-z}, E_y, H_z) L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element which be six-coordinated with oxygen and typical elements in groups 12 to 15 of the periodic table; $3 \leq x-3y-z \leq 7$; $0 \leq y < 0.22$; $0 \leq z \leq 2.8$; $2.5 \leq \alpha \leq 3.5$; $1.5 \leq \beta \leq 2.5$; and $11 \leq \gamma \leq 13$),
wherein a half-width of a diffraction peak which has a highest intensity and which is observed at a diffraction angle ($2\theta$) in a range of from 29° to 32° as a result of X-ray diffraction measurement using CuKα radiation, is 0.164° or less.

The element L may be La, and the element M may be at least one kind of element selected from the group consisting of Zr, Nb and Ta.

The half-width may be from 0.092° to 0.164°.

In another embodiment, there is provided a method for producing an oxide electrolyte sintered body, the method comprising:

preparing crystal particles of a garnet-type ion-conducting oxide represented by a general formula $(Li_{x-3y-z}, E_y, H_z) L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y < 0.22$; $0 < z \leq 2.8$; $2.5 \leq \alpha \leq 3.5$; $1.5 \leq \beta \leq 2.5$; and $11 \leq \gamma \leq 13$), wherein a half-width of a diffraction peak which has a highest intensity and which is observed at a diffraction angle ($2\theta$) in a range of from 29° to 32° as a result of X-ray diffraction measurement using CuKα radiation, is 0.164° or less, preparing a lithium-containing flux, and sintering a mixture of the flux and the crystal particles of the garnet-type ion-conducting oxide by heating at a temperature equal to or more than a melting point of the flux.

The element L may be La, and the element M may be at least one kind of element selected from the group consisting of Zr, Nb and Ta.

According to the disclosed embodiments, the garnet-type ion-conducting oxide configured to inhibit lithium carbonate formation on the surface of the crystal particles thereof, and a method for producing the oxide electrolyte sintered body using the garnet-type ion-conducting oxide, can be provided.

BRIEF DESCRIPTION OF THE DRAWINGS

In the accompanying drawings.

DETAILED DESCRIPTION

1. Garnet-Type Ion-Conducting Oxide

Figure 1:
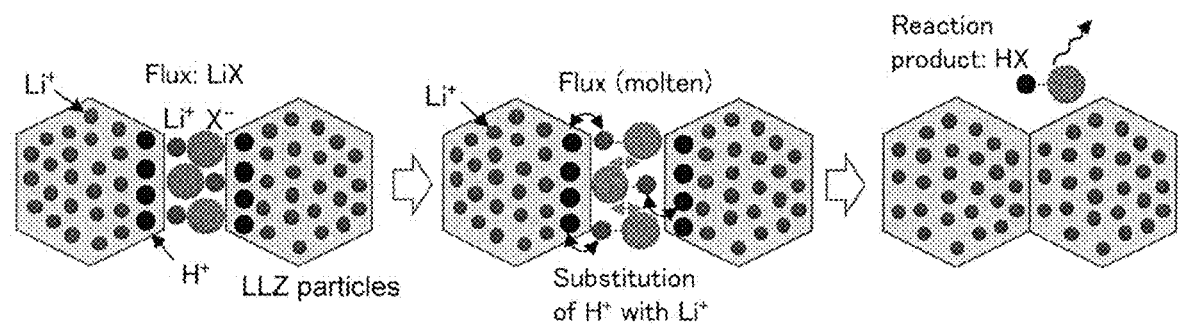
FIG. 1 is a schematic view showing the outline of a solid phase flux method used in an embodiment.

The garnet-type ion-conducting oxide of the disclosed embodiments is a garnet-type ion-conducting oxide represented by a general formula $(Li_{x-3y-z}, E_y, H_z)L_\alpha M_\beta O_\gamma$ (where E is at least one kind of element selected from the group consisting of Al, Ga, Fe and Si; L is at least one kind of element selected from an alkaline-earth metal and a lanthanoid element: M is at least one kind of element selected from a transition element which be six-coordinated with oxygen and typical elements in groups 12 to 15 of the periodic table; $3 \leq x-3y-z \leq 7$; $0 \leq y < 0.22$; $0 \leq z \leq 2.8$; $2.5 \leq \alpha \leq 3.5$; $1.5 \leq \beta \leq 2.5$; and $11 \leq \gamma \leq 13$), wherein a half-width of a diffraction peak which has a highest intensity and which is observed at a diffraction angle (2θ) in range of from 29° to 32° as a result of X-ray diffraction measurement using CuKα radiation, is 0.164° or less.

The garnet-type ion-conducting oxide (LLZ) is, for example, represented by the chemical formula $Li_7La_3Zr_2O_{12}$, and more than half of cations thereof are lithium ions. Therefore, the lithium ion concentration of the LLZ is very high.

Also, since the lithium ion conductivity of the LLZ is very high, the lithium ions can move very easily. In addition, since lithium is one of most base metals, the LLZ has very high reducing properties (reactivity).

Due to the above reason, the LLZ causes chemical reactions represented by the following formulae (1) and (2):

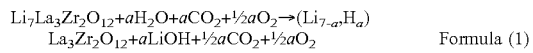

Formula (1)

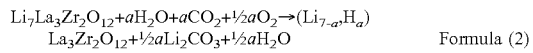

Formula (2)

For the chemical reaction represented by the formula (2), it is thought that the reaction can be controlled to some extent by controlling the state of Li involved in the reaction on the surface of the LLZ crystal particles.

The reason is considered as follows: the lithium involved in the reaction with $H_2O$ or $CO_2$ in the air, remains on the surface of the LLZ crystal particles, so that the lithium is still under the influence of the LLZ crystal, while being bonded to $H_2O$ or $CO_2$.

Also, it is thought that when the affinity (attraction) of the lithium in the LLZ is higher than the bonding force between the $H_2O$ or $CO_2$ and the lithium in the formula (2), the lithium can be inhibited from being extracted from the LLZ, and lithium carbonate ($Li_2CO_3$) formation can be inhibited.

As a result of considerable research, it was found that lithium carbonate formation on the surface of the LLZ crystal particles can be inhibited by increasing the crystallinity of the LLZ.

It is widely known that materials with low crystallinity show deliquescence. For example, crystalline materials such as lithium ion-conducting sulfide glass and lithium ion-conducting oxide glass (e.g., $Li_3PO_4$) generally show deliquescence in the air. This is because lithium present in an unstable position in the glass preferentially reacts with $H_2O$.

Therefore, it is thought that the deliquescence can be inhibited by increasing the crystallinity of the crystalline materials.

In the same manner as the inhibition of the deliquescence, lithium ions can be stably present in the LLZ crystal particles by increasing the crystallinity of the LLZ. As a result, it is presumed that reaction between lithium ions and $CO_2$ on the surface of the LLZ crystal particles can be inhibited, and lithium carbonate formation on the surface of the LLZ crystal particles can be inhibited.

Accordingly, since the garnet-type ion-conducting oxide of the disclosed embodiments has high crystallinity, it can inhibit lithium carbonate formation on the surface of the crystal particles.

The crystallinity of the garnet-type ion-conducting oxide can be evaluated by the half-width of a peak observed by X-ray diffraction.

For the garnet-type ion-conducting oxide of the disclosed embodiments, the upper limit of the half-width of a diffraction peak which has the highest intensity and which is observed at a diffraction angle (2θ) in a range of from 29° to 32° as a result of X-ray diffraction measurement using CuKα radiation, may be 0.164° or less. From the viewpoint of further inhibiting lithium carbonate formation on the surface of the LLZ crystal particles, it may be 0.154° or less. The lower limit of the half-width is not particularly limited, and it may be more than 0°. Considering the detection limit of an X-ray diffractometer, it may be 0.084° or more, or it may be 0.092° or more.

When the composition of the Li in the general formula $(Li_{x-3y-z}, E_y, H_z)L_\alpha M_\beta O_\gamma$ is $x-3y-z > 7$, it is presumed that the crystal structure of the LLZ is changed from a cubic crystal structure to a tetragonal crystal structure, thereby impairing crystal symmetry and decreasing lithium ion conductivity.

Meanwhile, when the composition of the Li in the general formula is $x-3y-z < 3$, it is presumed that the potential of the 96h site (a specific site in which the Li in the crystal structure of the LLZ will be incorporated) increases and makes it difficult for the Li to be incorporated in the crystal, thereby decreasing Li occupancy and decreasing lithium ion conductivity.

The element E is an element that is four-coordinated as with Li and has an ionic radius close to Li (Li: 0.59 Å).

In the disclosed embodiments, the LLZ may comprise, as the element E, at least one kind of element selected from the group consisting of Al, Ga, Fe and Si, at least one kind of element selected from the group consisting of Al and Ga, or an Al element.

The elements Al, Ga, Fe and Si as the element E, are major elements that are contained in garnet-type oxides that are well-known as gems.

Since Al, Ga, Fe and Si are elements that are contained in gems such as garnet, they can be substituted with the Li in the Li site.

The substitution of the Li site with the elements Al, Ga, Fe, Si, etc., has a crystal structure stabilizing effect.

On the other hand, it is presumed that the substitution with the elements Al, Ga, Fe, Si, etc., makes the property of the crystal closer to gem garnet (the Mohs hardness of gem garnet is 7.5).

As a result, it is presumed that once large amounts of Al, Ga, Fe, Si, etc., are incorporated, instead of plastic deformation, the particles cause cracking.

Therefore, it is presumed that although the addition of small amounts of Al, Ga, Fe, Si, etc., is allowed for the purpose of stabilizing the crystal structure, there is an upper limit to cause plastic deformation.

In the disclosed embodiments, since the element E in the general formula is contained in a range of $0 \leq y < 0.22$, the stability of the crystal structure of the LLZ can be increased, and the synthesis of the LLZ can be easy.

From the viewpoint of increasing the lithium ion conductivity, the element E in the general formula may be contained in a range of $0 \leq y < 0.12$ or in a range of $0 \leq y < 0.04$.

In the disclosed embodiments, the element L contained in the LLZ is not particularly limited, as long as it is at least one kind of element selected from the group consisting of an alkaline-earth metal and a lanthanoid element. This is because a small change in the crystal structure and high ion conductivity can be obtained. As used herein, the alkaline-earth metal is a concept that encompasses Ca, Sr, Ba and Ra. The element L may be La, since the ion conductivity can be further increased.

In the disclosed embodiments, as long as the element L of the general formula is contained in a range of $2.5 \leq \alpha \leq 3.5$, a change in the crystal structure of the LLZ is small, and the lithium ion conductivity of the LLZ can be increased. The $\alpha$ may be 3.

In the disclosed embodiments, the element M contained in the LLZ is not particularly limited, as long as it is at least one kind of element selected from the group consisting of a transition element that can be six-coordinated with oxygen and typical elements in groups 12 to 15 of the periodic table. This is because a change in the crystal structure of the LLZ is small, and the ion conductivity of the LLZ is high.

In the disclosed embodiments, as long as the element M of the general formula is contained in a range of $1.5 \leq \beta \leq 2.5$, a change in the crystal structure of the LLZ is small, and the lithium ion conductivity of the LLZ can be increased. The $\beta$ may be 2.

As the element M, examples include, but are not limited to, Sc, Y, Ti, Zr, Hf, V, Nb, Ta, Cr, Mo, W, Mn, Fe, Co, Ni, Cu, Zn, Cd, Al, Ga, Ge, Sn, Sb and Bi.

Of these elements, the element M may be at least one kind of element selected from the group consisting of Zr, Nb and Ta, or it may be a combination of Zr with Nb or Ta, from the viewpoint of obtaining a relatively large ionic radius, inhibiting a shrinkage in crystal lattice constant, and inhibiting a decrease in the lithium ion conductivity of the LLZ, and from the point of view that similar effects can be obtained since the elements have similar physical and/or chemical properties.

The ratio of the Zr and Nb or Ta in the composition of the LLZ has an influence on the physical value of the lithium ion conductivity and the crystal structure. As the ratio of the Zr increases, the amount of the Li increases.

In general, when the total amount of the Li and H in the composition of the LLZ is more than 6.75, the crystal structure changes from a cubic crystal structure to a tetragonal crystal structure. In general, the LLZ is said to have higher ion conductivity when the crystal structure is a cubic crystal structure.

Therefore, when the amount of the Zr in the composition is smaller, the total amount of the Li and H in the composition of the LLZ is small and makes it easy for the LLZ to have a cubic crystal structure.

However, when the amount of the Zr in the composition is decreased, a shrinkage in lattice volume occurs. As a result, the ion conducting path for the lithium ions that can move in the crystal, is decreased in size and, therefore, in lithium ion conductivity of the LLZ.

Due to the above reason, when the element M is the combination of Zr with Nb or Ta, the amount of the Zr in the composition may be in a range of from 1.4 to 1.75.

On the other hand, when the element M is the combination of Zr with Nb or Ta, the amount of the Nb or Ta in the composition may be in a range of from 0.25 to 0.6.

In the disclosed embodiments, as long as the oxygen O contained in the LLZ composition is in a range of $11 \leq \gamma \leq 13$, a change in the crystal structure of the LLZ can be small. The $\gamma$ may be 12.

As the garnet-type ion-conducting oxide before part of the lithium ions are substituted with hydrogen ions (hereinafter it may be referred to as the garnet-type ion-conducting oxide before the hydrogen ion partial substitution), examples include, but are not limited to, $Li_7La_3Zr_2O_{12}$, $Li_{6.4}La_3Zr_{1.4}Nb_{0.6}O_{12}$, $Li_{6.5}La_3Zr_{1.7}Nb_{0.3}O_{12}$, $Li_{6.8}La_3Zr_{1.7}Nb_{0.3}O_{12}$, $(Li_{6.2}Al_{0.2})La_3Zr_{1.7}Nb_{0.3}O_{12}$, $(Li_{5.8}Al_{0.2})La_3(Zr_{1.4}Nb_{0.6})O_{12}$, $(Li_{6.1}Al_{0.13})La_3(Zr_{1.4}Nb_{0.6})O_{12}$, $(Li_{6.3}Al_{0.02})La_3(Zr_{1.4}Nb_{0.6})O_{12}$, and $(Li_{6.2}Ga_{0.2})La_3Zr_{1.7}Nb_{0.3}O_{12}$.

In the LLZ of the disclosed embodiments, the amount of hydrogen ions (protons) incorporated by the substitution, is not particularly limited, as long as the z in the general formula $(Li_{x-3y-z}, E_y, H_z)L_\alpha M_\beta O_\gamma$ is in a range of $0 \leq z \leq 2.8$. This is because a change in the crystal structure is small.

The garnet-type ion-conducting oxide of the disclosed embodiments has high crystallinity, even if it is not subjected to proton substitution (even if the z is 0). Therefore, the garnet-type ion-conducting oxide can inhibit lithium carbonate formation on the surface of the crystal particles.

The method for substituting part of the lithium ions in the LLZ of the disclosed embodiments with hydrogen ions, is not particularly limited. As the method, examples include, but are not limited to, using a powder of the LLZ as a raw material and stirring and/or immersing the powder in pure water for several minutes to 5 days at room temperature.

The amount of hydrogen ions incorporated by the substitution can be estimated by inductively-coupled plasma (ICP) analysis of the powder of the LLZ before and after the substitution.

That is, the hydrogen ion amount in the LLZ cannot be quantitated by the inductively-coupled plasma (ICP) analysis; however, the lithium ion amounts in the LLZ before and after the hydrogen ion substitution can be quantitated.

Therefore, the amount of lithium ion change before and after the substitution can be calculated from the lithium ion amounts in the LLZ before and after the substitution. From the amount of the lithium ion change, it is possible to estimate how much lithium ions were substituted with hydrogen ions.

In general, at normal temperature, the garnet-type ion-conducting oxide of the disclosed embodiments is present as crystals. The crystals may be in a particulate form.

The average particle diameter of the crystal particles of the garnet-type ion-conducting oxide is not particularly limited. It may be in a range of from 0.1 μm to 100 μm.

In the disclosed embodiments, unless otherwise noted, "average particle diameter" means a 10% volume average particle diameter (hereinafter may be referred to as "D10") obtained from a particle size distribution measured with a laser scattering/diffraction particle size distribution analyzer.

The garnet-type ion-conducting oxide of the disclosed embodiments can be used as an electrode material for various kinds of batteries, an electrolyte material, etc. It can be used as an electrode material for all-solid-state batteries, an electrolyte material, etc.

2. The Method for Producing Oxide Electrolyte Sintered Body

The method for producing an oxide electrolyte sintered body according to the disclosed embodiments, comprises:

preparing crystal particles of a garnet-type ion-conducting oxide represented by a general formula $(Li_{x-3y-z}, E_y, H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y < 0.22$; $0 < z \leq 2.8$; $2.5 \leq \alpha \leq 3.5$; $1.5 \leq \beta \leq 2.5$; and $11 \leq \gamma \leq 13$), wherein a half-width of a diffraction peak which has a highest intensity and which is observed at a diffraction angle (2θ) in a range of from 29° to 32° as a result of X-ray diffraction measurement using CuKα radiation, is 0.164° or less, preparing a lithium-containing flux, and sintering a mixture of the flux and the crystal particles of the garnet-type ion-conducting oxide by heating at a temperature equal to or more than a melting point of the flux.

As disclosed in Non-Patent Literature 1, heating at 600° C. or more is considered to be necessary to decompose lithium carbonate formed on the surface of the LLZ crystal particles. If the oxide electrolyte sintered body is produced while the lithium carbonate remains on the surface of the LLZ crystal particles, a decrease in lithium ion conductivity may be caused by the lithium carbonate. Therefore, it is common to heat the LLZ crystal particles at a temperature of 600° C. or more, or the LLZ crystal particles may be heated at a temperature of 650° C. or more.

Meanwhile, the garnet-type ion-conducting oxide of the disclosed embodiments can inhibit lithium carbonate formation on the surface of the crystal particles. Therefore, by using the garnet-type ion-conducting oxide of the disclosed embodiments, lithium carbonate decomposition treatment at 600° C. or more becomes unnecessary.

In the method for producing the oxide electrolyte sintered body according to the disclosed embodiments, the crystal particles of the LLZ subjected to the partial substitution with the protons, are mixed with the lithium-containing flux. By heating the thus-obtained mixture, the protons in the crystal particles of the LLZ subjected to the partial substitution with the protons, can be resubstituted with the lithium ions in the flux. By use of the chemical reaction caused in this resubstitution, the crystal particles of the LLZ can be bonded at lower temperature than ever before (e.g., 350° C.)

The crystal particles of the LLZ subjected to the partial substitution with the protons, can be obtained by preliminarily synthesizing a hydrogen-free LLZ at high temperature (e.g., 800° C. to 950° C.) and substituting part of lithium ions in the crystal particles of the thus-obtained hydrogen-free LLZ with protons.

Therefore, according to the disclosed embodiments, an oxide electrolyte sintered body with high lithium ion conductivity can be obtained by sintering at lower temperature than ever before.

As a result, the electrode active material and the oxide electrolyte can be integrally sintered by selecting such a heating temperature that alternation, which is caused by the chemical reaction between the oxide electrolyte and the electrode active material, can be prevented in the production of the battery comprising the garnet-type ion-conducting oxide as the oxide electrolyte.

Also, battery production costs can be reduced by lowering the sintering temperature.

The method for producing the oxide electrolyte sintered body according to the disclosed embodiments comprises at least of (1) preparing the crystal particles of the garnet-type ion-conducting oxide, (2) preparing the flux, and (3) sintering a mixture of them.

(1) Preparing Crystal Particles of Garnet-Type Ion-Conducting Oxide

This step is preparing crystal particles of a garnet-type ion-conducting oxide represented by a general formula $(Li_{x-3y-z}, E_y, H_z)L_\alpha M_\beta O_\gamma$, wherein a half-width of a diffraction peak which has a highest intensity and which is observed at a diffraction angle (2θ) in a range of from 29° to 32° as a result of X-ray diffraction measurement using CuKα radiation, is 0.164° or less.

The crystal particles of the garnet-type ion-conducting oxide will not be described here, since they may be the same as those described above under "1. Garnet-type ion-conducting oxide", except that they are those subjected to proton substitution (in the above-mentioned general formula, $0 < z \leq 2.8$).

(2) Preparing a Lithium-Containing Flux

This step is preparing a lithium-containing flux.

The lithium-containing flux is not particularly limited. It may be a flux that has a melting point at around a temperature at which the hydrogen ions are desorbed from the crystal particles of the garnet-type ion-conducting oxide subjected to the hydrogen ion partial substitution (hereinafter it may be referred to as the garnet-type ion-conducting oxide after the hydrogen ion partial substitution). As the flux, examples include, but are not limited to, LiOH (melting point: 462° C.), $LiNO_3$ (melting point: 260° C.) and $Li_2SO_4$ (melting point: 859° C.) From the viewpoint of lowering the sintering temperature, the flux may be a flux having a low melting point, and it may be LiOH or $LiNO_3$.

(3) Sintering

This step is sintering a mixture of the flux and the crystal particles of the garnet-type ion-conducting oxide by heating at a temperature equal to or more than the melting point of the flux.

The sintering temperature may be equal to or more than the melting point of the flux. The sintering temperature may be 350° C. or more, or it may be 400° C. or more, from the viewpoint of promoting the resubstitution of, with the lithium ions in the lithium-containing flux, the protons in the crystal particles of the garnet-type ion-conducting oxide after the hydrogen ion partial substitution. As long as the crystal stability of the LLZ can be maintained, the sintering temperature may be 1000° C. or less, or it may be 850° C. or less. When a material other than the garnet-type ion-conducting oxide and the flux is used at the time of sintering, the sintering temperature may be such a temperature that the material does not react with the garnet-type ion-conducting oxide. In this case, the sintering temperature may be 650° C. or less, or it may be 550° C. or less.

According to the disclosed embodiments, even in the case of sintering at lower temperature than ever before (e.g., 350° C.), the oxide electrolyte sintered body having a desired lithium ion conductivity can be obtained.

In the sintering, a pressure is applied at the time of heating. The pressure is not particularly limited. From the viewpoint of increasing the lithium ion conductivity of the oxide electrolyte sintered body, the heating may be carried out under a pressure condition more than the atmospheric pressure. At the time of heating, the upper limit of the pressure is not particularly limited. For example, it may be 6 ton/cm² (≈588 MPa) or less.

The mixing ratio of the crystal particles of the garnet-type ion-conducting oxide and the flux is not particularly limited. It may be 50:50 (vol %) to 95:5 (vol %) since the desired oxide electrolyte sintered body can be efficiently obtained.

In the sintering, the sintering atmosphere is not particularly limited.

In this step, the sintering may be carried out by hot-pressing.

As used herein, the hot-pressing is a method of carrying out heating in an atmosphere-controlled furnace, with applying a pressure in a uniaxial direction.

By the hot-pressing, the oxide electrolyte particles cause plastic deformation and thus densification. As a result, it is considered that the density of the oxide electrolyte sintered body increases along with an increase in the bonding of the particles, thereby increasing the lithium ion conductivity.

The hot-pressing temperature may be equal to or more than the melting point of the flux. The hot-pressing temperature may be 350° C. or more, or it may be 400° C. or more, from the viewpoint of promoting the resubstitution of, with the lithium ions in the lithium-containing flux, the protons in the crystal particles of the garnet-type ion-conducting oxide after the hydrogen ion partial substitution. As long as the crystal stability of the LLZ can be maintained, the hot-pressing temperature may be 1000° C. or less, or it may be 850° C. or less. When a material other than the garnet-type ion-conducting oxide and the flux is used at the time of sintering, the hot-pressing temperature may be such a temperature that the material does not react with the garnet-type ion-conducting oxide. In this case, the sintering temperature may be 650° C. or less, or it may be 550° C. or less.

The hot-pressing pressure may be in a range of from 1 to 6 ton/cm$^2$ (≈98 to 588 MPa).

The hot-pressing time may be in a range of from 1 to 600 minutes.

In the disclosed embodiments, the crystal particles of the garnet-type ion-conducting oxide are bonded by a solid phase flux reaction method, using a chemical reaction between the flux material and the crystal particles of the garnet-type ion-conducting oxide (a solid phase) as driving force, thereby obtaining the oxide electrolyte sintered body.

FIG. 1 is a schematic view showing the outline of the solid phase flux reaction method used in the disclosed embodiments.

In FIG. 1, the figure on the left side shows the state of the mixture "before heating". The mixture is a mixture of the flux in a solid state and the crystal particles of the garnet-type ion-conducting oxide subjected to the substitution of part of the lithium ions (Li$^+$) with hydrogen ions (H$^+$). In FIG. 1, the particles are referred to as LLZ particles.

In FIG. 1, the figure on the center shows the state of the mixture "in the initial stage of the heating". As shown in the central figure of FIG. 1, when the mixture is heated to the melting point of the flux, the bonding between the lithium ions (Li$^+$) and anions (X$^-$) in the flux becomes weak. At this time, the hydrogen ions (H$^+$) in the crystal particles of the garnet-type ion-conducting oxide are substituted with the lithium ions (Li$^+$) in the flux.

Finally, in FIG. 1, the figure on the right side shows the state of the mixture "in the late stage of the heating". As shown in the right figure of FIG. 1, the lithium ions (Li$^+$) in the flux are incorporated into the crystal of the crystal particles of the garnet-type ion-conducting oxide. The hydrogen ions (H$^+$) released from the inside of the crystal of the crystal particles of the garnet-type ion-conducting oxide, are bonded to the anions (X$^-$) in the flux to form a reaction product and move outside the system; therefore, they do not remain between the crystal particles of the garnet-type ion-conducting oxide.

EXAMPLES

Example 1

[Synthesis of LLZ Crystal particles]

Stoichiometric amounts of LiOH(H$_2$O) (manufactured by Sigma-Aldrich), La(OH)$_3$ (manufactured by Kojundo Chemical Laboratory Co., Ltd.), Zr O$_2$ (manufactured by Kojundo Chemical Laboratory Co., Ltd.) and Nb$_2$O$_5$ (manufactured by Kojundo Chemical Laboratory Co., Ltd.) were used as starting raw materials. They were mixed to obtain a mixture.

The mixture and a flux (NaCl) were heated from room temperature to 950° C. for 8 hours and then kept at 950° C. for 20 hours, thereby obtaining LLZ crystal particles having the composition of Li$_{6.4}$La$_3$Zr$_{1.4}$Nb$_{0.6}$O$_{12}$. The mixture melted in the flux was controlled to be 2 mol %.

The 10% volume average particle diameter (D10) of the obtained crystal particles was 2.8 μm.

[Hydrogen Ion Partial Substitution]

Then, at room temperature, 2 g of the thus-obtained LLZ crystal particles before hydrogen ion partial substitution, were immersed in pure water (200 ml) for several minutes for partial substitution of lithium ions with hydrogen ions, thereby obtaining the LLZ crystal particles after the hydrogen ion partial substitution. The amount of the Li (in the composition of the LLZ) substituted with H, was 0.61. Results are shown in Table 1.

The LLZ crystal particles were subjected to ICP analysis before and after the hydrogen ion partial substitution. From the amount of change in the lithium element in the composition of the LLZ before and after the hydrogen ion partial substitution, the amount of hydrogen ions incorporated by the substitution was estimated. Then, the composition of the LLZ crystal particles after the hydrogen ion partial substitution, was estimated.

Example 2

[Synthesis of LLZ Crystal Particles]

LLZ crystal particles having the composition of Li$_{6.4}$La$_3$Zr$_{1.4}$Nb$_{0.6}$O$_{12}$ were obtained in the same manner as Example 1.

[Hydrogen Ion Partial Substitution]

Then, at room temperature, 2 g of the thus-obtained LLZ crystal particles before hydrogen ion partial substitution, were immersed in pure water (200 ml).

After several hours passed, 150 ml of the pure water was removed, and new pure water (150 ml) was added.

By the substitution of the Li in the crystal particles with H, the pH of the pure water was increased.

Until the increase in the pH of the pure water was not seen, in which the crystal particles were immersed, the replacement of the pure water was repeated for partial substitution of lithium ions with hydrogen ions, thereby obtaining the LLZ crystal particles after the hydrogen ion partial substitution. The amount of the Li (in the composition of the LLZ) substituted with H, was 2.32. Results are shown in Table 1.

Example 3

[Synthesis of LLZ Crystal Particles]

Stoichiometric amounts of LiOH(H$_2$O) (manufactured by Sigma-Aldrich), La(OH)$_3$ (manufactured by Kojundo Chemical Laboratory Co., Ltd.), ZrO$_2$ (manufactured by Kojundo Chemical Laboratory Co., Ltd.) and Nb$_2$O$_5$ (manufactured by Kojundo Chemical Laboratory Co., Ltd.) were used as starting raw materials. They were mixed to obtain a mixture.

The mixture and a flux (NaCl) were heated from room temperature to 950° C. for 8 hours and then kept at 950° C. for 20 hours, thereby obtaining LLZ crystal particles having the composition of $Li_{6.4}La_3Zr_{1.4}Nb_{0.6}O_{12}$. The mixture melted in the flux was controlled to be 2 mol %.

The 10% volume average particle diameter (D10) of the obtained crystal particles was 2.8 μm.

[Hydrogen Ion Partial Substitution]

Then, at room temperature, 2 g of the thus-obtained LLZ crystal particles before hydrogen ion partial substitution, were immersed in pure water (200 ml) for 8 hours for partial substitution of lithium ions with hydrogen ions, thereby obtaining the LLZ crystal particles after the hydrogen ion partial substitution. The amount of the Li (in the composition of the LLZ) substituted with H, was 0.78. Results are shown in Table 1.

Example 4

[Synthesis of LLZ Crystal Particles]

LLZ crystal particles having the composition of $Li_{6.4}La_3Zr_{1.4}Nb_{0.6}O_{12}$ were obtained in the same manner as Example 3.

[Hydrogen Ion Partial Substitution]

Then, at room temperature, 2 g of the thus-obtained LLZ crystal particles before hydrogen ion partial substitution, were immersed in pure water (200 ml) for 24 hours for partial substitution of lithium ions with hydrogen ions, thereby obtaining the LLZ crystal particles after the hydrogen ion partial substitution. The amount of the Li (in the composition of the LLZ) substituted with H, was 1.48. Results are shown in Table 1.

Example 5

[Synthesis of LLZ Crystal Particles]

LLZ crystal particles having the composition of $Li_{6.4}La_3Zr_{1.4}Nb_{0.6}O_{12}$ were obtained in the same manner as Example 3.

[Hydrogen Ion Partial Substitution]

Then, at room temperature, 2 g of the thus-obtained LLZ crystal particles before hydrogen ion partial substitution, were immersed in pure water (200 ml) for 40 hours for partial substitution of lithium ions with hydrogen ions, thereby obtaining the LLZ crystal particles after the hydrogen ion partial substitution. The amount of the Li (in the composition of the LLZ) substituted with H, was 1.76. Results are shown in Table 1.

Example 6

[Synthesis of LLZ Crystal Particles]

LLZ crystal particles having the composition of $Li_{6.4}La_3Zr_{1.4}Nb_{0.6}O_{12}$ were obtained in the same manner as Example 3.

[Hydrogen Ion Partial Substitution]

Then, at room temperature, 2 g of the thus-obtained LLZ crystal particles before hydrogen ion partial substitution, were immersed in pure water (200 ml) for 56 hours for partial substitution of lithium ions with hydrogen ions, thereby obtaining the LLZ crystal particles after the hydrogen ion partial substitution. The amount of the Li (in the composition of the LLZ) substituted with H, was 2.31. Results are shown in Table 1.

Example 7

[Synthesis of LLZ Crystal Particles]

Stoichiometric amounts of $LiOH(H_2O)$ (manufactured by Sigma-Aldrich), $La(OH)_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as starting raw materials. They were mixed to obtain a mixture.

The mixture and a flux ($Li_3BO_3$) were heated from room temperature to 900° C. for 90 minutes and then kept at 900° C. for 20 hours, thereby obtaining LLZ crystal particles having the composition of $Li_{6.4}La_3Zr_{1.4}Nb_{0.6}O_{12}$. The mixture melted in the flux was controlled to be 50 mol %.

The 10% volume average particle diameter (D10) of the obtained crystal particles was 3.2 μm.

[Hydrogen Ion Partial Substitution]

Then, at room temperature, 2 g of the thus-obtained LLZ crystal particles before hydrogen ion partial substitution, were immersed in pure water (200 ml) for 24 hours for partial substitution of lithium ions with hydrogen ions, thereby obtaining the LLZ crystal particles after the hydrogen ion partial substitution. The amount of the Li (in the composition of the LLZ) substituted with H, was 1.84. Results are shown in Table 1.

Example 8

[Synthesis of LLZ Crystal Particles]

The LLZ crystal particles synthesized in Example 7 were prepared, the crystal particles having the composition of $Li_{6.4}La_3Zr_{1.4}Nb_{0.6}O_{12}$.

[Hydrogen Ion Partial Substitution]

Then, at room temperature, 2 g of the prepared LLZ crystal particles before hydrogen ion partial substitution, were immersed in pure water (200 ml) for 48 hours for partial substitution of lithium ions with hydrogen ions, thereby obtaining the LLZ crystal particles after the hydrogen ion partial substitution. The amount of the Li (in the composition of the LLZ) substituted with H, was 1.99. Results are shown in Table 1.

Comparative Example 1

[Synthesis of LLZ Crystal Particles]

The LLZ crystal particles synthesized in Example 7 were prepared, the crystal particles having the composition of $Li_{6.4}La_3Zr_{1.4}Nb_{0.6}O_{12}$.

[Hydrogen Ion Partial Substitution]

Then, at room temperature, 2 g of the prepared LLZ crystal particles before hydrogen ion partial substitution, were immersed in pure water (200 ml) for 72 hours for partial substitution of lithium ions with hydrogen ions, thereby obtaining the LLZ crystal particles after the hydrogen ion partial substitution. The amount of the Li (in the composition of the LLZ) substituted with H, was 2.13. Results are shown in Table 1.

Comparative Example 2

Stoichiometric amounts of $LiOH(H_2O)$ (manufactured by Sigma-Aldrich), $La(OH)_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as starting raw materials. They were mixed to obtain a mixture.

The mixture and a flux (NaCl and KCl) were heated from room temperature to 800° C. for 8 hours and then kept at 800° C. for 20 hours, thereby obtaining LLZ crystal particles having the composition of $Li_{6.4}La_3Zr_{1.4}Nb_{0.6}O_{12}$. The mixture melted in the flux was controlled to be 2 mol %. The NaCl and KCl used as the flux were controlled to be at a molar ratio of 1:1.

The 10% volume average particle diameter (D10) of the obtained crystal particles was 3.2 μm.

[Hydrogen Ion Partial Substitution]

Then, at room temperature, 2 g of the thus-obtained LLZ crystal particles before hydrogen ion partial substitution, were immersed in pure water (200 ml) for one hour for partial substitution of lithium ions with hydrogen ions, thereby obtaining the LLZ crystal particles after the hydrogen ion partial substitution. The amount of the Li (in the composition of the LLZ) substituted with H, was 0.67. Results are shown in Table 1.

Comparative Example 3

[Synthesis of LLZ Crystal Particles]

Stoichiometric amounts of $LiOH(H_2O)$ (manufactured by Sigma-Aldrich), $La(OH)_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as starting raw materials. They were mixed to obtain a mixture.

The mixture and a flux (NaCl and KCl) were heated from room temperature to 850° C. for 8 hours and then kept at 850° C. for 20 hours, thereby obtaining LLZ crystal particles having the composition of $Li_{6.4}La_3Zr_{1.4}Nb_{0.6}O_{12}$. The mixture melted in the flux was controlled to be 2 mol %. The NaCl and KCl used as the flux were controlled to be at a molar ratio of 1:1.

The 10% volume average particle diameter (D10) of the obtained crystal particles was 3.2 μm.

[Hydrogen Ion Partial Substitution]

Then, at room temperature, 2 g of the thus-obtained LLZ crystal particles before hydrogen ion partial substitution, were immersed in pure water (200 ml) for one hour for partial substitution of lithium ions with hydrogen ions, thereby obtaining the LLZ crystal particles after the hydrogen ion partial substitution. The amount of the Li (in the composition of the LLZ) substituted with H, was 0.66. Results are shown in Table 1.

Example 9

[Synthesis of LLZ Crystal Particles]

Stoichiometric amounts of $LiOH(H_2O)$ (manufactured by Sigma-Aldrich), $La(OH)_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as starting raw materials. They were mixed to obtain a mixture.

The mixture and a flux (NaCl and KCl) were heated from room temperature to 900° C. for 8 hours and then kept at 900° C. for 20 hours, thereby obtaining LLZ crystal particles having the composition of $Li_{6.4}La_3Zr_{1.4}Nb_{0.6}O_{12}$. The mixture melted in the flux was controlled to be 2 mol %. The NaCl and KCl used as the flux were controlled to be at a molar ratio of 1:1.

The 10% volume average particle diameter (D10) of the obtained crystal particles was 3.2 μm.

[Hydrogen Ion Partial Substitution]

Then, at room temperature, 2 g of the thus-obtained LLZ crystal particles before hydrogen ion partial substitution, were immersed in pure water (200 ml) for one hour for partial substitution of lithium ions with hydrogen ions, thereby obtaining the LLZ crystal particles after the hydrogen ion partial substitution. The amount of the Li (in the composition of the LLZ) substituted with H, was 0.69. Results are shown in Table 1.

TABLE 1

| | $2\theta$ (°) | Half-width (°) | Amount of H | $CO_2$ (mol) | LLZ (mol) | $CO_2$/LLZ |
|---|---|---|---|---|---|---|
| Example 1 | 30.911 | 0.092 | 0.61 | 6.1506E−08 | 3.52385E−05 | 1.7454E−03 |
| Example 2 | 30.842 | 0.154 | 2.32 | 7.3011E−08 | 2.8008E−05 | 2.6068E−03 |
| Example 3 | 30.893 | 0.094 | 0.78 | 3.6861E−08 | 3.15383E−05 | 1.1688E−03 |
| Example 4 | 30.85 | 0.105 | 1.48 | 4.8295E−09 | 2.74357E−05 | 1.7603E−04 |
| Example 5 | 30.849 | 0.118 | 1.76 | 2.6562E−08 | 3.61643E−05 | 7.3449E−04 |
| Example 6 | 30.844 | 0.164 | 2.31 | 3.7216E−08 | 2.19073E−05 | 1.6988E−03 |
| Example 7 | 30.852 | 0.155 | 1.84 | 6.1506E−08 | 2.46596E−05 | 2.4942E−03 |
| Example 8 | 30.84 | 0.164 | 1.99 | 9.5099E−08 | 2.44147E−05 | 3.8952E−03 |
| Comparative Example 1 | 30.883 | 0.169 | 2.13 | 1.3509E−07 | 2.44229E−05 | 5.5311E−03 |
| Comparative Example 2 | 30.852 | 0.237 | 0.67 | 4.9631E−07 | 1.15738E−05 | 4.2882E−02 |
| Comparative Example 3 | 30.893 | 0.196 | 0.66 | 1.1016E−07 | 3.47854E−05 | 3.1667E−03 |
| Example 9 | 30.893 | 0.158 | 0.69 | 1.0767E−07 | 2.89609E−05 | 3.7178E−03 |

In Table 1, "Amount of H" is the amount of hydrogen contained in the LLZ composition, and it is a value calculated by carrying out ICP analysis on the LLZ crystal particles before and after the hydrogen ion partial substitution and estimating the amount of hydrogen incorporated by the substitution from the amount of change in the lithium element.

Also in Table 1, "$CO_2$ (mol)" is the molar amount of $CO_2$ adsorbed on the LLZ crystal particles. It was obtained as follows: the mass of the LLZ crystal particles on which $H_2O$ and $CO_2$ are adsorbed at normal temperature, is calculated; thermogravimetric/differential thermal analysis (TG-DTA) is carried out on the LLZ crystal particles; from the resulting data at 900° C., the mass of the LLZ crystal particles from which the $H_2O$ and $CO_2$ have been desorbed, is calculated; and from the resulting data at 600° C. to 800° C., the amount of the $CO_2$ adsorbed on the LLZ crystal particles is calculated and converted to a molar value.

In Table 1, "LLZ (mol)" is a value obtained as follows: thermogravimetric/differential thermal analysis (TG-DTA) is carried out on the LLZ crystal particles on which $H_2O$ and $CO_2$ are adsorbed at normal temperature, and from the resulting data at 900° C., the mass of the LLZ crystal particles from which the $H_2O$ and $CO_2$ have been desorbed, is calculated and converted to a molar value.

In Table 1, "$CO_2$/LLZ" is a value of the molar amount of the $CO_2$ adsorbed per mol of the LLZ and is obtained by dividing the above-obtained "$CO_2$ (mol)" by the above-obtained "LLZ (mol)".

As shown in Table 1, it is clear that there is no correlation between the half-width of the LLZ crystal particles and the molar amount of the $CO_2$ adsorbed per mol of the LLZ. As shown in Table 1, it is also clear that there is no correlation between the amount of the H in the composition of the LLZ crystal particles and the molar amount of the $CO_2$ adsorbed per mol of the LLZ.

[XRD Measurement]

XRD measurement was carried out on the LLZ crystal particles after the hydrogen ion partial substitution obtained in Examples 1 to 9 and Comparative Examples 1 to 3 to measure the half-width of a diffraction peak which has the highest intensity and which is observed at a diffraction angle (2θ) in a range of from 29° to 32°. Results are shown in Table 1.

XRD measurement conditions are as follows.
Device: RINT-TTRIII wide angle x-ray diffractometer (manufactured by Rigaku Corporation)
X-ray source: CuKα radiation
Tube voltage-tube current: 50 kV-300 mA
Step width: 0.01 deg
Measurement rate: One second/step
Slit: 0.5 deg-0.15 mm-0.5 deg
Monochromator: Diffraction curved-crystal monochromator As shown in Table 1, the half-width of the thus-obtained LLZ crystal particles after the hydrogen ion partial substitution, is 0.092° in Example 1, 0.154° in Example 2, 0.094° in Example 3, 0.105° in Example 4, 0.118° in Example 5, 0.164° in Example 6, 0.155° in Example 7, 0.164° in Example 8, 0.158° in Example 9, 0.169° in Comparative Example 1, 0.237° in Comparative Example 2, and 0.196° in Comparative Example 3.

Figure 2:
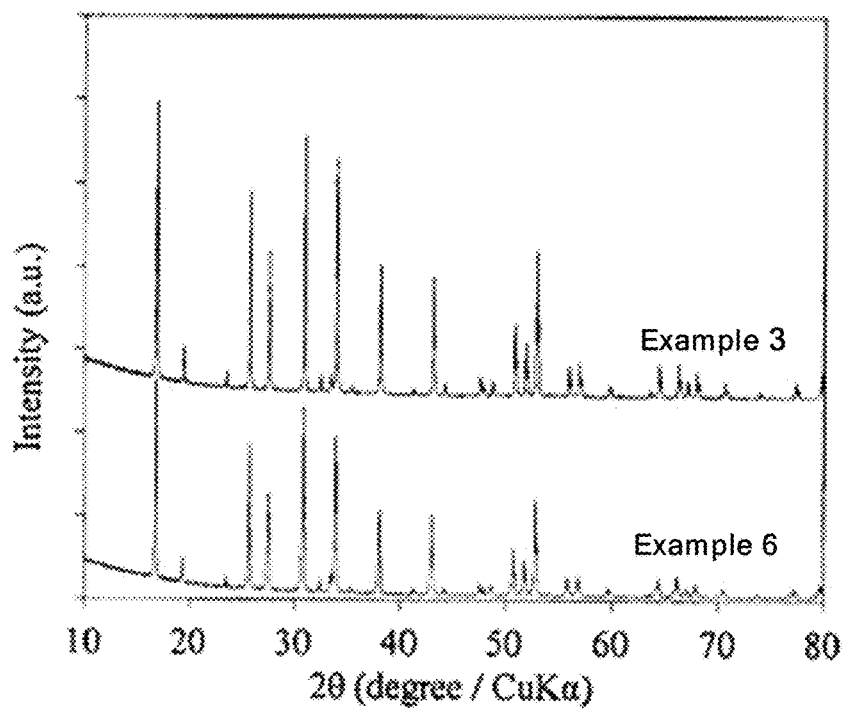
FIG. 2 shows an overview of a XRD pattern of LLZ crystal particles of Example 3 and that of Example 6.

As an example, FIG. 2 shows an overview of a XRD pattern of the LLZ crystal particles of Example 3 and that of Example 6.

Figure 3:
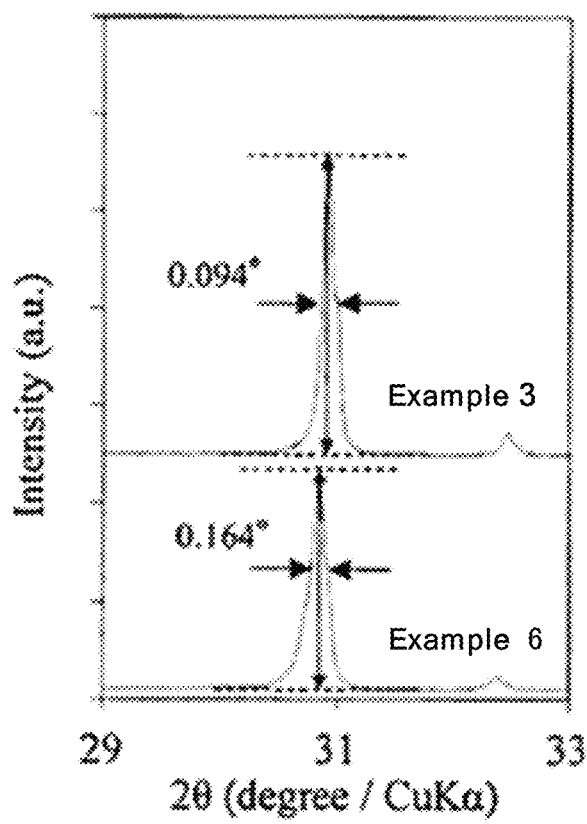
FIG. 3 shows an enlarged image of a peak at 30.8° shown in FIG. 2.
Figure 4:
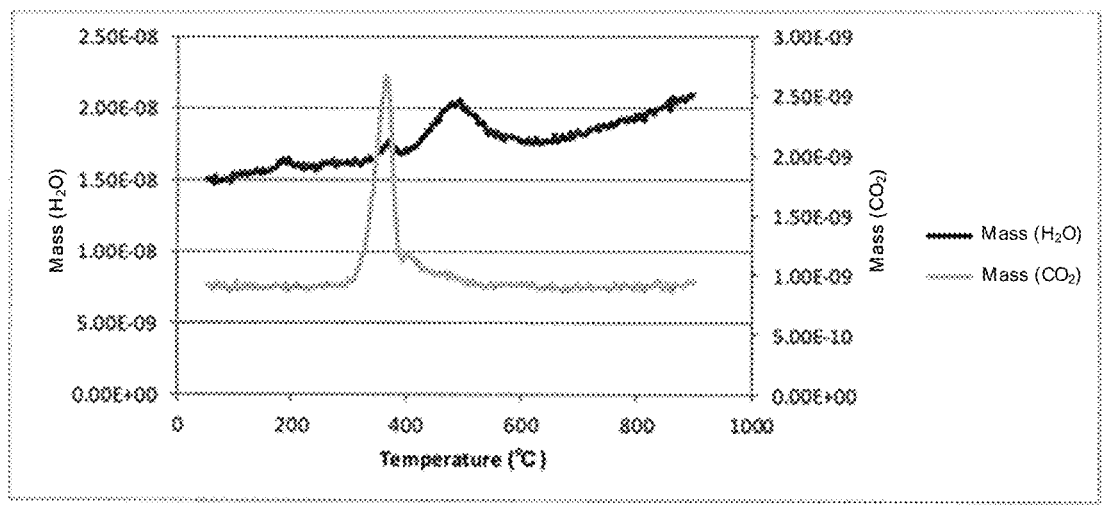
FIG. 4 shows mass spectrometry results of Example 1.
Figure 5:
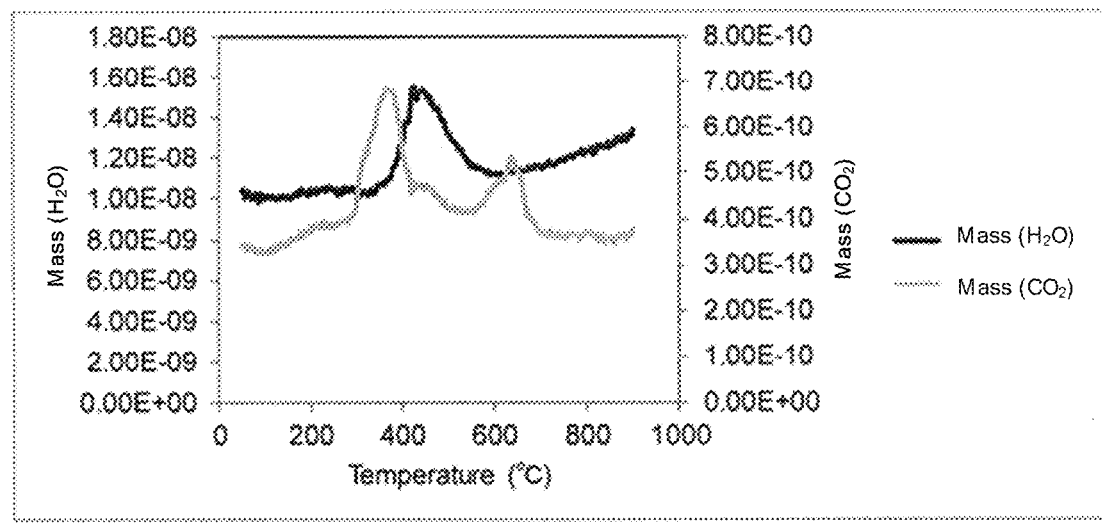
FIG. 5 shows mass spectrometry results of Example 6.
Figure 6:
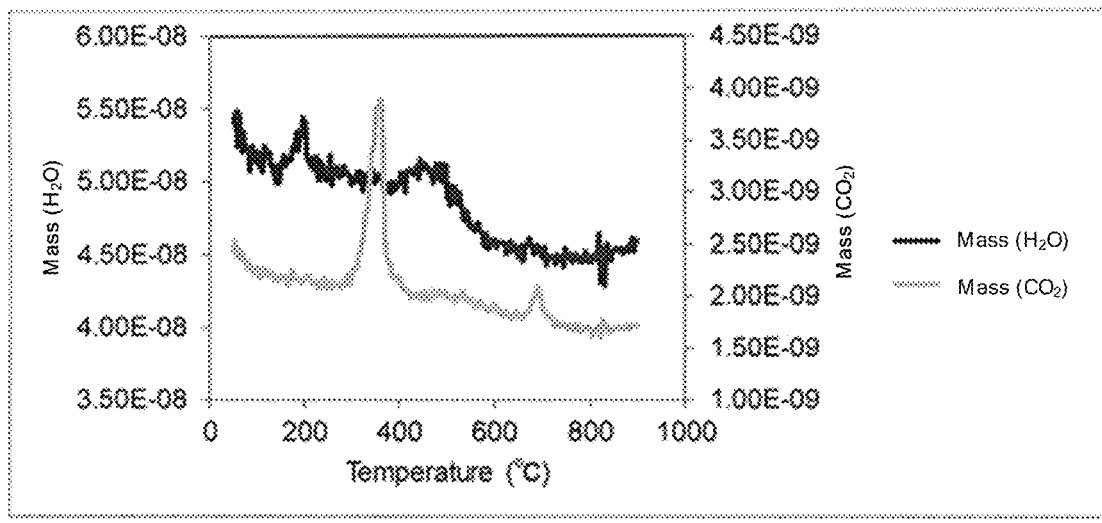
FIG. 6 shows mass spectrometry results of Example 9.

FIG. 3 shows an enlarged image of a peak at 30.8° shown in FIG. 2.

Also, FIG. 3 shows the half-width of the peak at 30.8°.

[Mass Spectrometry]

Mass spectrometry was carried out on the LLZ crystal particles after the hydrogen ion partial substitution obtained in Examples 1 to 9 and Comparative Examples 1 to 3.

The mass spectrometry was carried out by use of simultaneous thermogravimetric differential analysis photoionization mass spectrometer ThermoMass (product name, manufactured by Rigaku Corporation).

As an example, mass spectrometry results of Examples 1, 6 and 9 and Comparative Example 1 are shown in FIGS. 4 to 7. In FIGS. 4 to 7, "Mass" on the vertical axis is an amount of substance (mol).

For Example 1, only a peak at around 400° C., which indicates $CO_2$ decomposition, was observed. From this result, it is clear that $CO_2$ evaporates at a temperature of 400° C. or less.

For Comparative Example 1, peaks at around 400° C. and around 700° C., which indicate $CO_2$ decomposition, were observed. From this result, $CO_2$ decomposition was also confirmed at a temperature of about 700° C., in addition to 400° C. This $CO_2$ desorption at 700° C. is considered to be due to lithium carbonate decomposition. This indicates that for the LLZ crystal particles of Comparative Example 1, the Li reacts with $CO_2$ on the particle surface to form $Li_2CO_3$, and heating at about 700° C. is needed to decompose the $Li_2CO_3$.

For Examples 6 and 9, a slight peak at around 700° C., which indicates $CO_2$ decomposition, was observed. However, it is clear that the peak is smaller than Comparative Example 1.

From the above results, the following is clear. For Example 1, lithium carbonate was not formed on the surface of the LLZ crystal particles, since a peak at around 700° C., which indicates $CO_2$ decomposition, was not observed. For Examples 6 and 9, since a peak at around 700° C., which indicates $CO_2$ decomposition, is smaller than Comparative Example 1, lithium carbonate formation on the surface of the LLZ crystal particles is inhibited.

[Half-Width]

Figure 8:
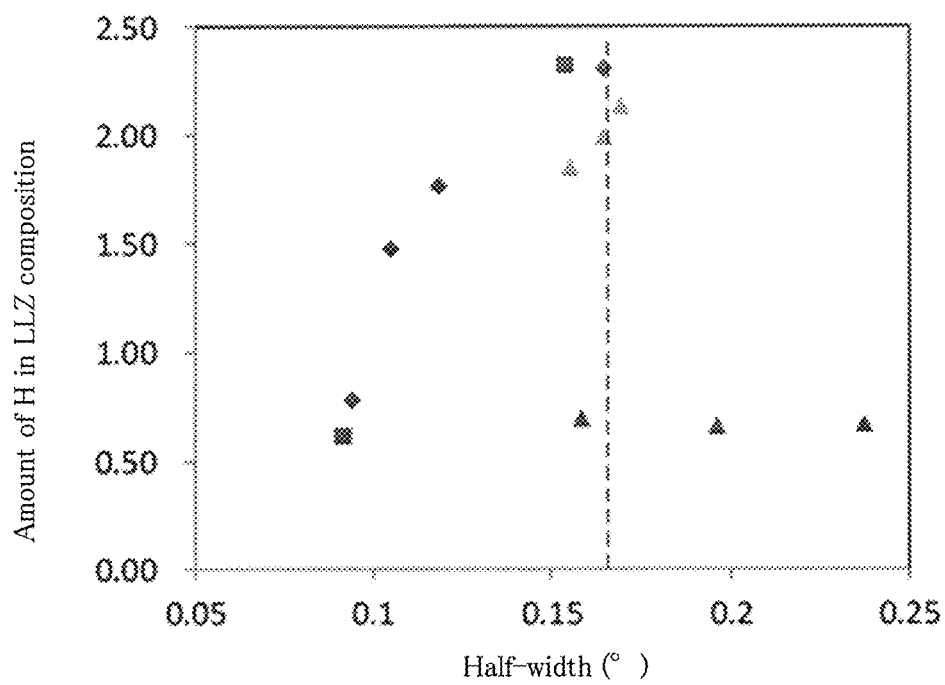
FIG. 8 is a view in which the half-width of LLZ crystal particles produced in each example and the amount of H in the composition of the LLZ crystal particles, are plotted.

FIG. 8 is a view in which the half-width of the LLZ crystal particles produced in each of Examples 1 to 9 and Comparative Examples 1 to 3 and the amount of H in the composition of the LLZ crystal particles, are plotted.

As shown in FIG. 8 and Table 1, it is clear that there is no correlation between the half-width of the LLZ crystal particles and the amount of the H in the composition of the LLZ crystal particles.

By the mass spectrometry, the LLZ crystal particles after the hydrogen ion partial substitution of Examples 1 to 9 and Comparative Examples 1 to 3, were checked for the presence or absence of $CO_2$ desorption due to lithium carbonate decomposition at a temperature of 700° C. or more. As a result, for the LLZ crystal particles of Examples 1 to 9 having a half-width of 0.164° or less, a peak at around 700° C., which indicates $CO_2$ decomposition, was not observed.

Therefore, it is presumed that as long as the half-width is 0.164° or less, lithium carbonate formation on the surface of the LLZ crystal particles can be inhibited in spite of the amount of the H in the composition of the LLZ crystal particles.

As described above, as shown in Table 1, there is no correlation between the half-width of the LLZ crystal particles and the molar amount of the $CO_2$ adsorbed per mol of the LLZ.

Therefore, it is presumed that as long as the half-width is 0.164° or less, lithium carbonate formation on the surface of the LLZ crystal particles can be inhibited in spite of the molar amount of the $CO_2$ adsorbed per mol of the LLZ.

It is presumed that these results are due to the following reason: as long as the half-width is 0.164° or less, the LLZ crystal particles have high crystallinity, allow lithium ions to be stably present inside the particles, and can inhibit a reaction between lithium ions and $CO_2$ on the surface of the particles.

Reference Example 1

A powder of LLZ crystal particles having a half-width of 0.164° or less, was prepared. The amount of the prepared powder was 0.4 g.

Then, the powder was pressed under conditions of 4 ton/cm² (≈392 MPa) and room temperature, thereby obtaining a pressed powder.

Reference Example 2

A powder of LLZ crystal particles having a half-width of 0.164° or less, was prepared. The amount of the prepared powder was 0.4 g.

Then, the powder was dry-mixed with, as a flux, a powder mixture of $LiNO_3$ and LiOH by use of a mortar. The resulting mixture was hot-pressed under conditions of 400° C. and 1 ton/cm² (≈98 MPa) for 480 minutes, thereby obtaining a pressed powder.

Reference Example 3

A powder of LLZ crystal particles having a half-width of more than 0.164° and having lithium carbonate formed thereon, was prepared. The amount of the prepared powder was 0.4 g.

Then, the powder was dry-mixed with, as a flux, a powder mixture of $LiNO_3$ and LiOH by use of the mortar. The resulting mixture was hot-pressed under conditions of 400° C. and 1 ton/cm² (≈98 MPa) for 480 minutes, thereby obtaining a pressed powder.

Reference Example 4

A powder of LLZ crystal particles having a half-width of more than 0.164° and having lithium carbonate formed thereon, was prepared. The amount of the prepared powder was 0.4 g.

Then, the powder was pressed under conditions of room temperature and 4 ton/cm² (≈392 MPa), thereby obtaining a pressed powder.

[AC Impedance Measurement]

AC impedance measurement was carried out on the pressed powders produced in Reference Examples 1 to 4. The AC impedance measurement was carried out by use of Potentiostat 1470 (product name, manufactured by Solartron) and Impedance Analyzer FRA1255B (product name, manufactured by Solartron) and under conditions of a voltage swing of 25 mV, a measurement frequency (F) of from 0.1 Hz to 1 MHz, a measurement temperature of 25° C., and normal pressure.

Figure 9:
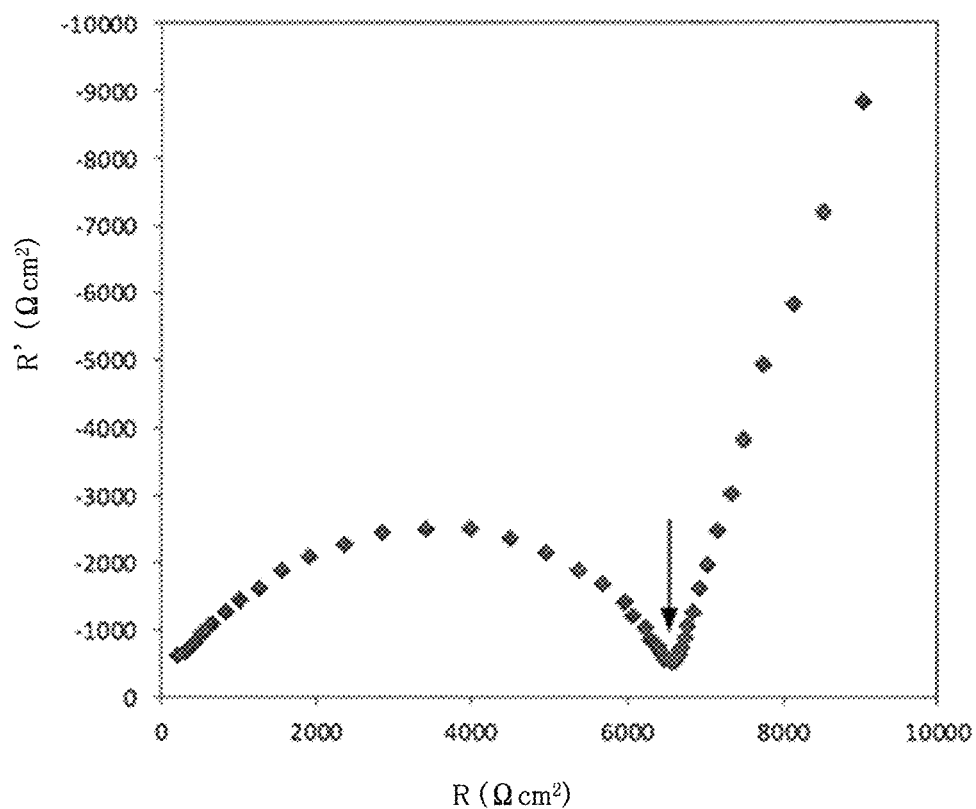
FIG. 9 is a view showing AC impedance measurement results of Reference Example 1.
Figure 10:
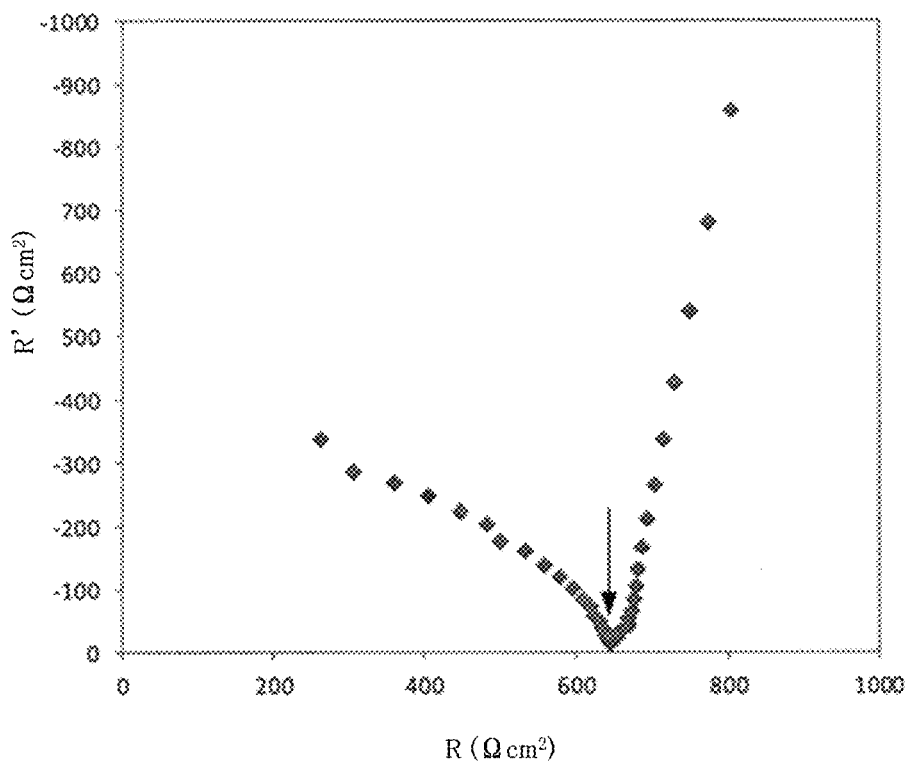
FIG. 10 is a view showing AC impedance measurement results of Reference Example 2.
Figure 11:
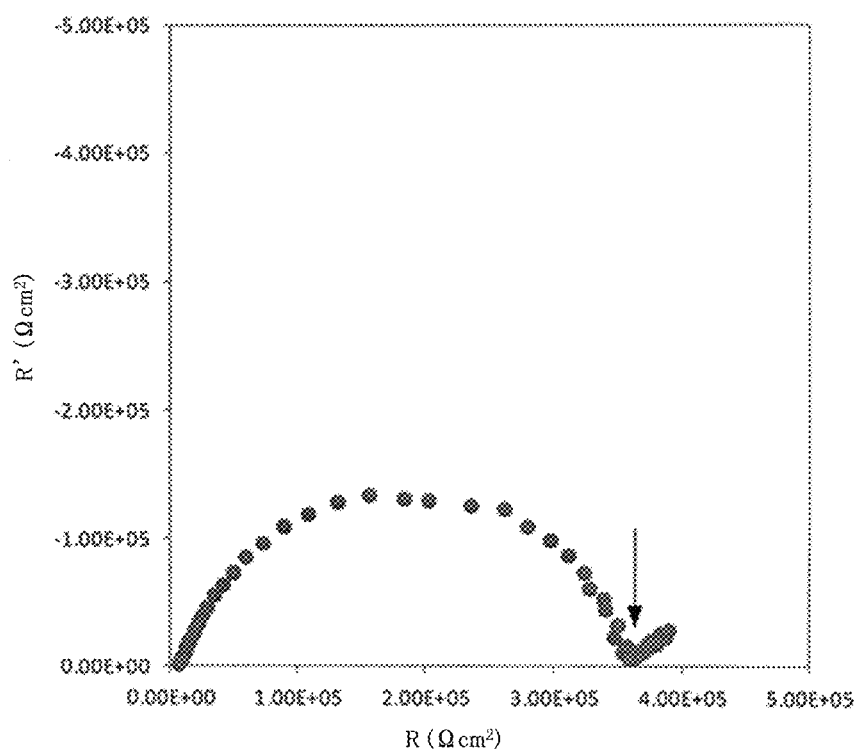
FIG. 11 is a view showing AC impedance measurement results of Reference Example 3.
Figure 12:
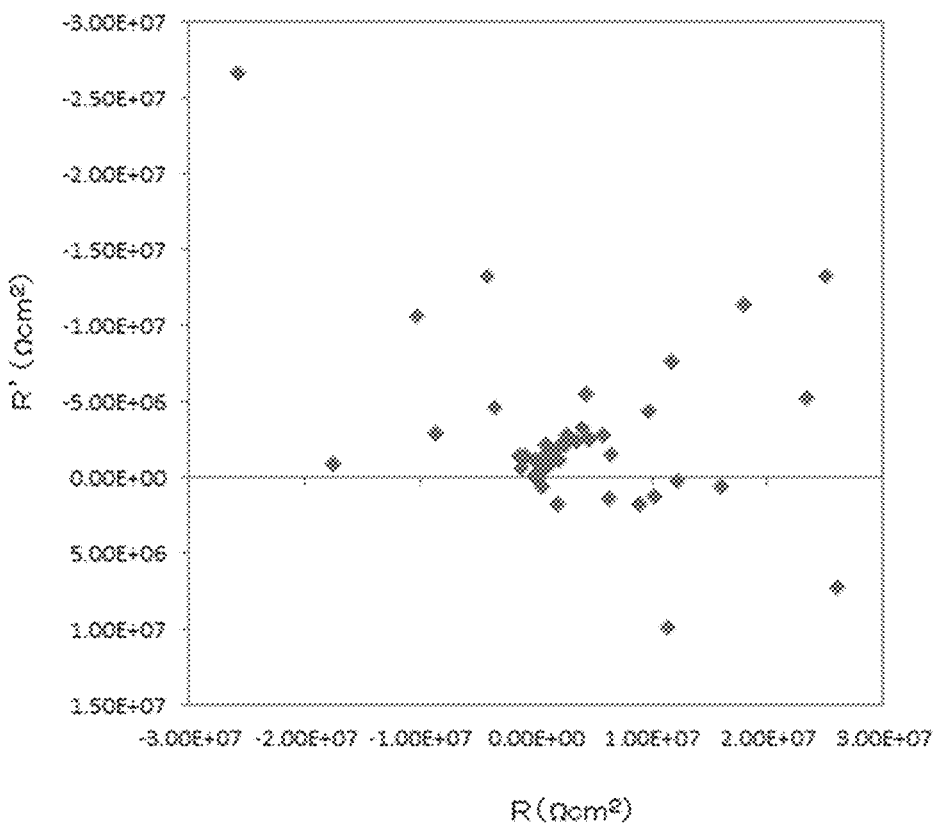
FIG. 12 is a view showing AC impedance measurement results of Reference Example 4.

AC impedance measurement results are shown in FIG. 9 (Reference Example 1), FIG. 10 (Reference Example 2), FIG. 11 (Reference Example 3) and FIG. 12 (Reference Example 4). For the pressed powders of Reference Examples 1 to 4, FIGS. 9 to 12 are graphs with the surface resistance R' (Ω cm²) of an imaginary component on the vertical axis and the surface resistance R (Ω cm²) of a real component on the horizontal axis.

Figure 7:
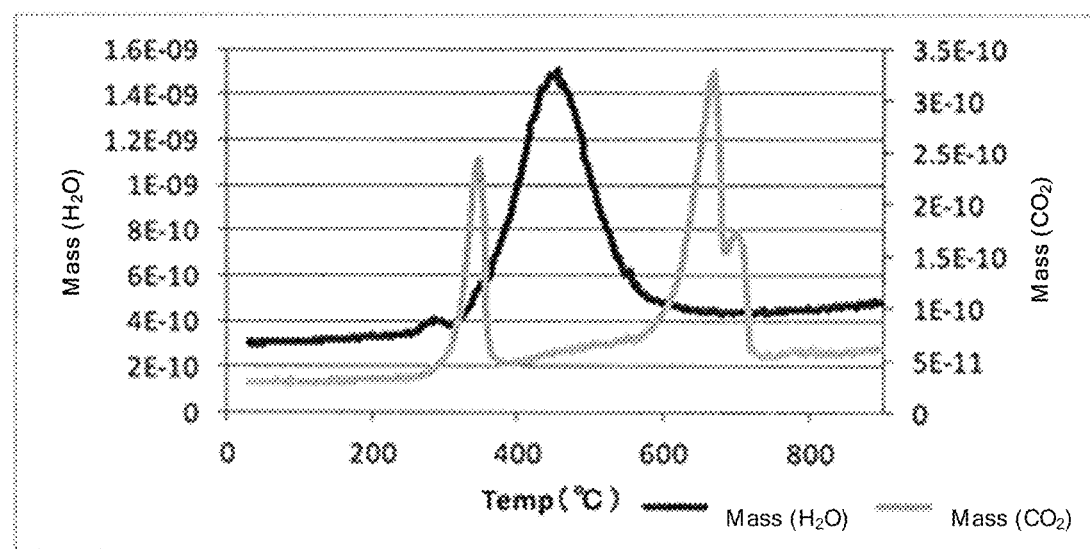
FIG. 7 shows mass spectrometry results of Comparative Example 1.

Each arrow shown in FIGS. 9 to 11 indicates bulk impedance. As shown in FIGS. 7 to 9, the bulk impedance is $6.5 \times 10^3$ in Reference Example 1, $6.5 \times 10^2$ in Reference Example 2, and $3.6 \times 10^5$ in Reference Example 3.

As shown in FIG. 12, bulk impedance could not be measured in Reference Example 4. Therefore, it is presumed that Reference Example 4 has very high resistance and high insulation properties.

From the AC impedance measurement results, it is clear that as shown in FIGS. 9 to 11, the bulk impedance of Reference Example 3 is 100 to 1000 times higher than Reference Examples 1 and 2. Therefore, it is clear that the LLZ crystal particles on which lithium carbonate is not formed, have smaller bulk impedance and higher lithium ion conductivity.

It is also clear that Reference Example 2 has smaller bulk impedance than Reference Example 1. Therefore, it is clear that bulk impedance can be smaller by hot-pressing.

From the results of Reference Examples 3 and 4, it is clear that when lithium carbonate is formed on the surface of the LLZ crystal particles, the lithium ion conductivity of the particles is low even after the particles are subjected to hot-pressing.

The invention claimed is:

1. A method for producing an oxide electrolyte sintered body, the method comprising:
    subjecting crystal particles of a garnet-type ion-conducting oxide to a hydrogen ion partial substitution step in which lithium ions are substituted with hydrogen to obtain crystal particles of a garnet-type ion-conducting oxide represented by the following formula (1):

$$(Li_{x-3y-z}E_yH_z)L_\alpha M_\beta O_\gamma \qquad (1),$$

wherein, in formula (1), E is at least one element selected from the group consisting of Al, Ga, Fe and Si; L is La; M is at least one element selected from the group consisting of Zr, Nb and Ta; $3 \leq x-3y-z \leq 7$; $0 \leq y < 0.22$; $0 < z \leq 2.8$; $2.5 \leq \alpha \leq 3.5$; $1.5 \leq \beta \leq 2.5$; and $11 \leq \gamma \leq 13$,
    wherein a half-width of a diffraction peak which has a highest intensity and which is observed at a diffraction angle (2θ) in a range of from 29° to 32° as a result of X-ray diffraction measurement using CuKα radiation is from 0.092° to 0.164°,
    preparing a lithium-containing flux, and
    sintering a mixture of the flux and the crystal particles of the garnet-type ion-conducting oxide represented by the formula (1), by heating at a temperature equal to or more than a melting point of the flux.

* * * * *